US011403710B1

(12) United States Patent
Davidson et al.

(10) Patent No.: US 11,403,710 B1
(45) Date of Patent: Aug. 2, 2022

(54) REWARD SYSTEM AND METHOD FOR A USER VEHICLE EQUIPPED WITH MONITORING SENSORS

(71) Applicants: Daniel Scott Davidson, Searcy, AR (US); Dana Andrew Steil, Searcy, AR (US); Stephen Asa Baber, Searcy, AR (US)

(72) Inventors: Daniel Scott Davidson, Searcy, AR (US); Dana Andrew Steil, Searcy, AR (US); Stephen Asa Baber, Searcy, AR (US)

(*) Notice: Subject to any disclaimer, the term of this patent is extended or adjusted under 35 U.S.C. 154(b) by 518 days.

(21) Appl. No.: 15/281,429

(22) Filed: Sep. 30, 2016

Related U.S. Application Data

(63) Continuation-in-part of application No. 15/202,725, filed on Jul. 6, 2016.

(60) Provisional application No. 62/189,123, filed on Jul. 6, 2015.

(51) Int. Cl.
    *G06Q 10/10* (2012.01)
    *G06Q 40/08* (2012.01)
    *G06Q 30/02* (2012.01)

(52) U.S. Cl.
    CPC ......... *G06Q 40/08* (2013.01); *G06Q 30/0239* (2013.01)

(58) Field of Classification Search
    CPC ..... G06Q 40/08; G06Q 30/0239; G06Q 10/10
    USPC .......................................................... 705/4
    See application file for complete search history.

(56) References Cited

U.S. PATENT DOCUMENTS

| | | | | |
|---|---|---|---|---|
| 8,595,037 | B1* | 11/2013 | Hyde | G06Q 40/08 701/2 |
| 2002/0010599 | A1* | 1/2002 | Levison | G06Q 30/0207 705/4 |
| 2008/0281641 | A1* | 11/2008 | Pilzer | G06Q 10/10 705/4 |
| 2009/0030795 | A1* | 1/2009 | Winchester | G06Q 20/102 705/14.27 |
| 2010/0138359 | A1* | 6/2010 | Alter | G06Q 40/02 705/36 R |
| 2012/0116876 | A1* | 5/2012 | Graham, Jr. | G06Q 30/02 705/14.53 |
| 2012/0310750 | A1* | 12/2012 | Schutzbank | G06Q 30/02 705/14.72 |
| 2013/0339124 | A1* | 12/2013 | Postrel | G06Q 30/0233 705/14.33 |

(Continued)

OTHER PUBLICATIONS

STIC NPL (non-patent literature) Search Report, dated Apr. 13, 2022. (Year: 2022).*

*Primary Examiner* — Hai Tran

(57) ABSTRACT

An insurance payment reward system using sensors integrated into a vehicle operated by an insurance policy holder may be used to reduce the insurance policy payment of the insurance policy holder when the insurance policy holder purchases goods or services from a third-party business participating in the reward program. The onboard vehicle sensors transmit information to a data center that translates the vehicle characteristics into available reward opportunities at participating local businesses. In exchange for the insurance policy holder's purchase of goods or services from a participating business, the business deposits a reward amount into an account that provides credits to the insurance policy holder's insurance payment or other rewards or incentives.

26 Claims, 2 Drawing Sheets

(56) References Cited

U.S. PATENT DOCUMENTS

| | | | | |
|---|---|---|---|---|
| 2014/0214750 A1* | 7/2014 | Healy | ............... | G07C 5/0808 |
| | | | | 706/48 |
| 2014/0258056 A1* | 9/2014 | Afshari | ............ | G06Q 40/123 |
| | | | | 705/31 |
| 2015/0039444 A1* | 2/2015 | Hardin | ........... | G06Q 30/0273 |
| | | | | 705/14.69 |
| 2015/0339745 A1* | 11/2015 | Peter | ............... | G06Q 30/0613 |
| | | | | 705/26.42 |
| 2016/0253710 A1* | 9/2016 | Publicover | .......... | H04W 4/21 |
| | | | | 705/14.66 |

* cited by examiner

REWARD SYSTEM AND METHOD FOR A USER VEHICLE EQUIPPED WITH MONITORING SENSORS

CROSS-REFERENCE TO RELATED APPLICATIONS

This application is a continuation-in-part application of, and claims the benefit of, U.S. patent application Ser. No. 15/202,725, entitled "Vehicle with Automated Insurance Payment Apparatus" and filed on Jul. 6, 2016, which claims the benefit of U.S. Provisional Patent Application No. 62/189,123, entitled "Vehicle Information Method and System for Payment of Insurance Policy Premiums," filed on Jul. 6, 2015. Such applications are incorporated herein by reference in their entirety.

BACKGROUND OF THE INVENTION

The present invention relates to a system and method for implementing a reward scheme in a user vehicle fitted with a series of sensors that monitor, record, and communicate user vehicle characteristics to create premium payment reimbursements or available awards of credits towards the future payment of premiums that are displayed and selected by a user via, for example, a mobile application.

Auto insurance premiums account for a large monthly and yearly expenditure for the owners of vehicles. For example, according to the National Association of Insurance Commissioners, the average auto insurance expenditure for one vehicle alone in the United States is typically $700-$900 per year. This expenditure is in the form of an insurance premium, which is currently set based on an actuarial analysis of risk factors, including, for example, age, gender, marital status, and the insured's driving record. The premiums may be simply for liability in the case of an automobile accident—coverage which is generally required by law to certain minimums—but may also include "comprehensive" or collision insurance. It is estimated that insured persons not directly involved in an accident could still be paying for nearly 75% of all vehicular accident costs, and most of that payment comes through these insurance premiums collected by the insurance company. Thus, many consumers are burdened with paying high premiums for services that they will seldom or never use.

With the high price for insurance premiums, some insurance companies have begun to implement cost-saving or premium-reducing promotions to attract persons to their insurance business. For example, many companies offer "safe driver" discounts in premiums, deductibles, or other financial rewards. To implement these systems, insurance companies have developed devices that connect to the on-board electronics of a vehicle and monitor the driving technique of the driver to determine the degree of risk of that particular driver. For example, one monitor may record driving habits of the insured driver to include, without limitation, the number of hard-braking events the driver incurs; the average speed; the number of times a certain speed is exceeded; and the maximum speed obtained. If the device records habits that are considered safe, the insurance rate for that driver may be decreased or the driver may receive a "reward" in the form of a refund of some amount of the insurance premium paid or other incentives. On the other hand, if the record reveals driving habits that are deemed to be of higher risk, the insurance rate may not be reduced. In effect, more aggressive drivers will be paying higher premiums, since they do not reap the discounts or rewards that safer drivers receive.

With the advancement of technology, some methods have even been developed to base insurance on the use of an autonomous drive mode system. These methods use characteristics of the autonomous drive system (such as model name and manufacture of the autonomous drive system, accuracy of the system, and the configuration of the system) to dynamically change insurance policy properties based on the reduced or increased likelihood of an automobile accident given the accuracy and use of the autonomous driving system. While these existing methods are mindful of the relationship between insurance policy properties and autonomous drive mode selection systems, a method is desired for dynamically changing insurance premiums or other insurance policy properties based not on the risk factors arising from the driver's driving habits or the change in likelihood of an accident, but instead on vehicle characteristics and other external factors completely independent of the operation of the vehicle. The inventor hereof has recognized that such a method and system would allow insurance premiums and other insurance policy properties to be reduced irrespective of the use of an autonomous driving system and could be used in vehicles that are operated manually, lowering the insurance premium of a wider market of users. Where an autonomous driving system is implemented, however, such an invention could serve to improve the existing technology directed toward reducing the policy payments, and could be capable in certain implementations of eliminating such payments altogether.

BRIEF SUMMARY OF THE INVENTION

The present invention is directed to a system and method for implementing a payment or reward scheme in a user vehicle fitted with a series of sensors that monitor, record, and communicate user vehicle characteristics to compute premium payment reimbursements or available awards of credits towards the future payment of premiums that may be viewed and selected by a user via a mobile application. In certain embodiments of the invention, the user may generate sufficient reimbursements such that the insurance premium may, for example, be reduced or eliminated entirely. The invention in certain embodiments may be used for many types of policies to reach a wider market of users.

In certain embodiments, the system uses a number of sensors located on the user vehicle to provide the user with reimbursement opportunities available from local third-party business participants based on the ability of the onboard sensors to record, monitor, and translate characteristics of the driver, passengers, vehicle, and vehicle environment into a list of available insurance reimbursements. The system is not dependent on an autonomous drive mode system, but instead can be used whether the autonomous drive mode system is enabled or whether the driver is operating the vehicle manually. It is understood that a greater reimbursement, or even an entire reimbursement, of the premium cost to the user can be achieved in certain embodiments of the invention quicker with autonomous vehicles than manually operated vehicles, but nevertheless the invention is capable of reducing the premium in manually operated vehicles to some degree. As the vehicle is operated, either autonomously or manually, the sensors located onboard the vehicle monitor and record the physical characteristics of the vehicle, which are used to generate a number of available reimbursement opportunities. The system is capable of dynamically changing the policy reimbursement opportunities in response to a third-party business's interest in providing goods or services to the user associated with the particular characteristic based on information gathered by the onboard sensors about the driver, passengers, vehicle, or environment.

DETAILED DESCRIPTION OF THE PREFERRED EMBODIMENT(S)

Figure 1:
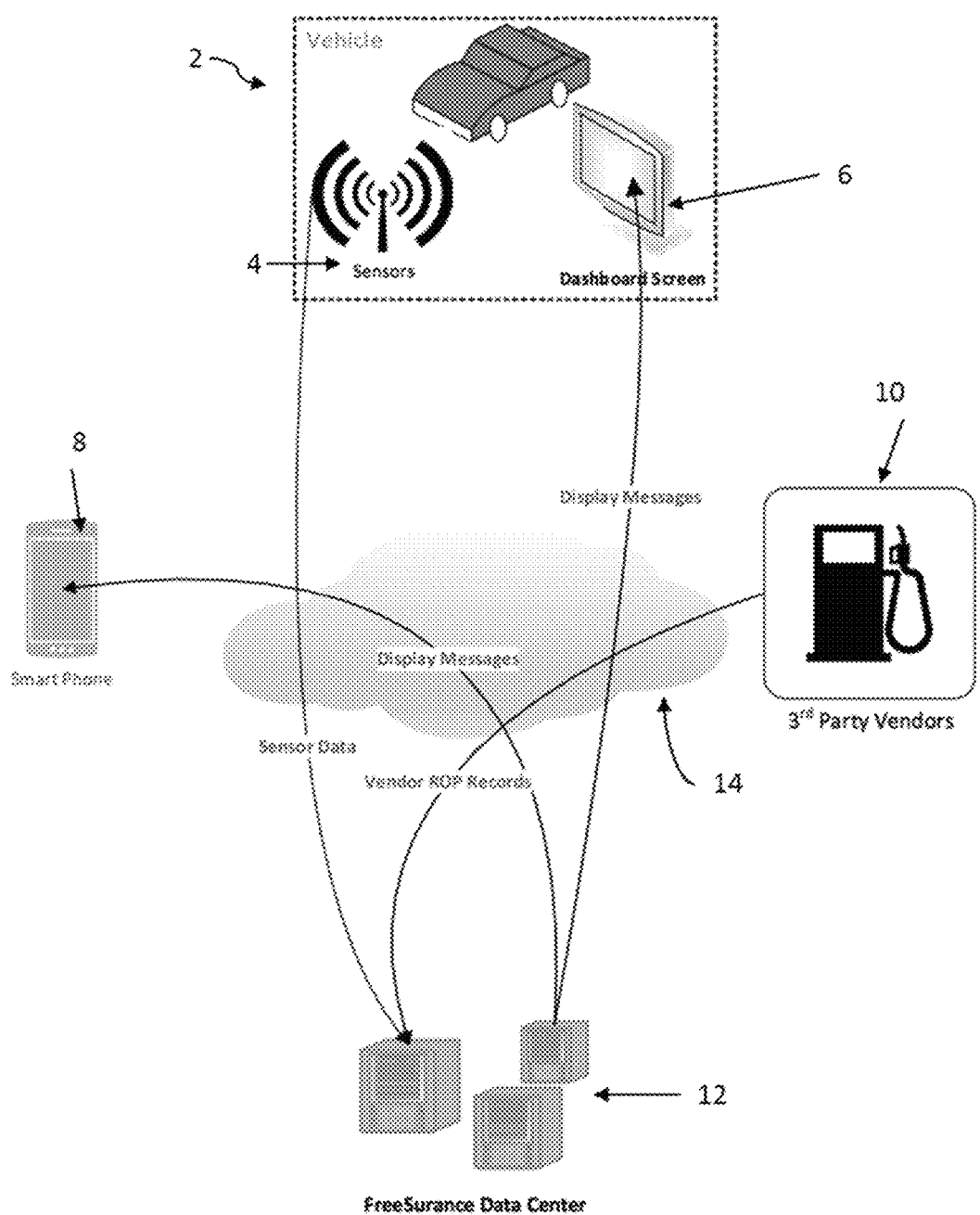
FIG. 1 is a schematic of the overall system, displaying the sensors located at the user vehicle, the third-party business participant server, the system database, the transmitting network, and the user interface (dashboard screen or smart phone, for example) that communicates the available reimbursement opportunities to the user or user vehicle.

The present invention is directed toward a system and method for implementing a payment or reward scheme in a user vehicle fitted with a series of sensors that monitor, record, and translate user vehicle characteristics into available premium payment reimbursements or available awards of credits towards the future payment of premiums that may be viewed and selected by the user via a mobile application. Generally, the system consists of a user vehicle 2, a number of sensors 4 incorporated into the user vehicle 2 responsible for recording vehicle information, a system database 12 responsible for interpreting recorded information and generating a list of available third-party participants based on the recorded information, and a mobile application incorporated into a user display 8 that communicates the available information to the system user. The mobile application allows the user to select a third-party participant 10 from whom the user will purchase goods or services and in return the user will be given a return of a specified amount on its policy premium. The abbreviation "ROP" may be used throughout this description to signify a "return of premium" reward or discount.

For purposes of this invention, examples will be provided with regard to automobile insurance policies, but it is understood that this process may be used for other types of insurance policies, such as life insurance, health insurance, disability insurance, worker's compensation insurance, or any other contract or policy based on risk-transference between the policy holder (the insured) and the policy provider. Furthermore, the invention may be applied to "bundled" insurance products that include multiple types of insurance; for example, the insured may sign up for the service described herein in connection with an automobile insurance policy, but may receive a benefit in the form of return of premiums (ROP) on other types of insurance that are a part of the bundle, such as home, life, and health insurance, either in addition to or in lieu of the return of premiums for the automobile insurance policy. The insurance providing entity may be a corporation, agent, independent contractor, or any entity responsible for satisfying claims under the insurance policy. The policy provider need not necessarily be a traditional insurance company. The terms of such insurance policy, including without limitation premiums and deductibles, may be herein referred to as "insurance policy properties." Although many examples are provided with regard to insurance premiums, it is understood that the present invention can generate a reimbursement for any number of such insurance policy properties.

With regard to FIG. 1, the system can be described in more detail. The system consists of a user vehicle 2, which incorporates a number of sensors 4 designed to monitor, record, and transmit certain vehicle characteristics to a data center 12. The characteristics recorded by the onboard vehicle sensors 4 for the driver, passengers, vehicle, vehicle environment, and other characteristics recorded are collectively referred to as "user vehicle characteristics." In one embodiment, the insurance premium reward system is implemented in a standard vehicle 2 either being driven autonomously or manually by an insured driver. One or more monitoring sensors 4, either an integral part of the vehicle 2 or an external device incorporated into the vehicle 2, is capable of recording and reporting pertinent user vehicle characteristics, which for example may include, without limitation, information about the driver, any passengers, the vehicle, and the environment surrounding the vehicle to a system database 12. In one embodiment, the system database 12 may be maintained by the insurer or a third-party marketing provider. User vehicle characteristics that may be recorded include the vehicle's 2 location, the time of day, the weather in the vicinity, the fuel level of the vehicle 2, the mileage of the vehicle 2, and the air pressure of the tires on the vehicle 2, among many other characteristics associated with the use of the vehicle 2.

In certain embodiments, the location of the user vehicle 2 is an important feature that must be recorded and transmitted to the system database 12 because the list or map of suggested third-party participants 10 will be generated based on the vehicle's location, with the third-party businesses listed based on proximity to the user vehicle 2. In certain embodiments the monitoring sensors 4 use technology well-known in the industry to record such location information. For example, one of the onboard sensors 4 may use GPS monitoring of the vehicle's location to geo-locate the vehicle 2. Thus, multiple monitoring sensors 4 may simultaneously record that the vehicle 2 is both in need of oil and in the downtown area. The monitoring sensors 4 will transmit these sensor records via the wireless network 14 to the system database 12, which then will generate a list of service stations in the downtown area, or within a certain proximity to the user vehicle's location. Any combination of characteristics recorded by the monitoring sensors 4 can be used to generate a more specific list of third-party participants 10 that can meet the user vehicle's needs based on those characteristics. Given the high degree of accuracy to which GPS location information and/or cellular tower location information can be generated, it is even possible in certain embodiments to record the vehicle 2 as proceeding on a particular street or route that can be matched to a corresponding retailer 10 on that street or any connected streets.

As the user vehicle characteristics are recorded they are reported to the system database 12 as a "vehicle entry sensor data" record, which may be directly accessible by the insurer. The following code is an example of a vehicle entry sensor data record that may be transmitted to the database 12:
{
  "ACCT": "123-45-6789",
  "VIN": "1FT1X6S6H41307570",
  "TIME": "2016-07-31:21:02:28 UTC",
  "LATITUDE": 34.7519616741771,
  "LONGITUDE": -92.3405449145954,
  "FUEL": 71.0,
  "SPEED": 44.6,

"MILEAGE": 17257.7,
"OIL": "ON",
"TIRE": "OFF"
}

In one embodiment, as shown in the above example, the vehicle entry sensor data record will provide the database 12 with certain information pertinent to the user vehicle 2 associated with that sensor 4. For example, both the account information of the user (ACCT) and the vehicle identification number (VIN) associated with the vehicle 2 may be recorded, in addition to the latitude and longitude of the vehicle's 2 location, the fuel level percentage of the vehicle 2, the vehicle's speed, the vehicle's mileage, whether the vehicle 2 needs an oil change (shown as OIL "ON" or "OFF") and whether the vehicle 2 needs new tires (shown as TIRE "ON" or "OFF"). In the above example, the sensor 4 has recorded that the oil pressure of the user vehicle 2 is low, as indicated by "OIL: ON". This sensor record will be interpreted by the database 12 and will be used to generate a list of third-party participants 10 that offer oil change services, as described in further detail below.

In addition to sensors 4 located on the vehicle 2 to monitor and record the fuel level, tire pressure, location, speed, mileage and oil level of the vehicle 2, several other sensors 4 may be incorporated into the vehicle 2 to monitor and record other user vehicle characteristics. For example, the vehicle 2 may also be outfitted with sensors 4 that detect fluid levels (antifreeze, wiper fluid, etc.) or other sensors 4 that detect windshield wiper use in order to determine wear and tear on the wipers. In addition, sensors 4 incorporated into the cabin of the vehicle 2 may monitor and record characteristics associated with the driver and passengers. These sensors 4 may record the weight of the driver or passengers, voice recognition of passengers, or facial recognition of passengers. Generally, any sensor 4 that may monitor the behavior of the driver or passengers or that may monitor a particular condition associated with the vehicle 2 may be implemented. The sensors 4 may be cameras, level indicators, or any other means of monitoring pertinent information.

In certain embodiments, the user vehicle characteristics will be monitored and recorded by one or more of the onboard sensors 4 constantly and in real-time, with the user vehicle characteristics recorded by the sensors 4 preferably transmitted to the system database 12 through a wireless network 14. In some embodiments, to minimize the bandwidth use on the wireless network 14, the sensors 4 transmit an initial-complete set of characteristics to the server 12, and then the sensors 4 only transmit characteristics as they change. A periodic heartbeat signal is used to inform the server 12 that the vehicle 2 is still active even when there are no characteristic changes to transmit. This real-time recording and transmitting of the user vehicle characteristics allows a relevant list of suggested third-party businesses 10 that offer a return on the insurance premium to be generated and transmitted to the user or vehicle 2 at the precise moment its relevance is highest.

Once any of a number of sensors 4 indicates a change in a particular user vehicle characteristic, the sensor 4 records and transmits the information to the system database 12 as a "vehicle entry sensor data" record (as discussed above). The system database 12 receives the user vehicle characteristics from the sensors 4 and interprets the user vehicle characteristics to generate a list or map of available third-party participants 10. Information pertaining to the third-party participants 10 is stored in the database 12 according to the information provided by the third-party participant 10, as discussed below. The list or map provides the user with information regarding available reimbursement or award opportunities provided by relevant participating third-party businesses 10. The database server 12 generates and transmits the suggested list in the form of a "user message suggestion type" record. For example, if the database server 12 receives a vehicle entry sensor data record from a sensor or sensors 4 onboard the user vehicle 2 indicating the oil pressure of the vehicle 2 is low, the database server 12 may generate and transmit to the user interface 6, 8 the following code:

```
{
  "ACCT": "123-45-6789",
  "VIN": "1FT1X6S6H41307570",
  "MESSAGE": "Low Oil Pressure",
  "ServiceStations":
  [
     <List of all participating service stations, ascending order by distance
     from current location:>
     {
        "NAME": "Exxon",
        "ADDRESS": "612 E Roosevelt Rd, Little Rock, AR 72206",
        "LATITUDE": 34.724386,
        "LONGITUDE": -92.267446,
        "PricePerGal": 2.82,
        "ROP": 1.50,
        "CouponAmt": "10%",
     },
     {
        "NAME": "Exxon",
        "ADDRESS": "2623 Main St, North Little Rock, AR 72114",
        "LATITUDE": 34.77875,
        "LONGITUDE": -92.266823,
        "PricePerGal": 2.66,
        "ROP": 1.50,
        "CouponAmt": "10%",
     },
     <etc>
  ]
}
```

In this example, the code above will be used to display a suggested list of participating service stations that offer oil change services. The list will be displayed on the user interface, whether a mobile phone 6 or other mobile display 8, as described in detail below. The database 12 also maintains records of all of the return-of-premium reimbursements that the user has accumulated, which may also be communicated to the user interface 6, 8, as described below.

A third-party business 10 that is interested in providing a return on premium through a coupon or discount based on the same or similar user vehicle characteristics as those recorded about the user or user vehicle 2 may choose to participate in the return-of-premium (ROP) program through a server maintained by the third-party business. In exchange for the ability of the third-party business 10 to be listed as a participant on the list generated by the database 12, the third-party business 10 will pay a fee to the insurer. Generally, the third-party participants 10 provide a return to the user in a specified amount when the user uses the ROP reward system to purchase goods or services provided by the third-party business 10. For example, after a user visits one of the third-party vendor participants 10 and satisfies the requirements to obtain the associated return of premium, a "return of premium entry vendor type" record will be transmitted to the database 12 to record that the user has satisfied such requirements. The following is an example of a record sent to the database 12, indicating that the user associated with the account (ACCT) listed has satisfied the requirements associated with the vendor (NAME) provided:

```
{
    "ACCT": "123-45-6789",
    "VIN": "1FT1X6S6H 1307570",
    "TIME": "2016-07-29:02:38:03 UTC",
    "NAME": "Exxon",
    "AMOUNT": 1.50
}
```

In exchange for the user satisfying the requirements for that third-party vendor's 10 associated return of premium, a portion of the fee paid by that third-party vendor 10 will then be credited to a deposit account set up for the insured driver, such that a portion of the fee will pay for a portion of or the entirety of that insured driver's insurance policy premium or other insurance policy property. In the above example, the record indicates that the user has satisfied the return of premium requirements associated with "Exxon" and that the user should be credited with $1.50 (AMOUNT) toward the user's insurance premium. Where the premium or other policy property is already reduced, for example because of the implementation of an accurate autonomous driving system, the third-party business's fee may cover an additional portion or the entire portion of the insurance premium or other insurance property, thereby drastically limiting or completely eliminating the financial burden on the insured user altogether.

The third-party business participants 10 can be any businesses that seek to attract consumers to their businesses, including without limitation retail chains, restaurants, gas stations, or any other entity that desires to reach drivers through the system, as the suggestion list generated by the database 12 will only include the names, locations, and other details of third-party participants 10. The third-party participants 10 are able to pre-select consumer criteria that are of interest to them so that the lists generated can be directed to the consumers most likely to engage in business with the third-party participant. Once the user vehicle information is recorded at the system database 12, the database 12 determines whether the sensors 4 indicate the user vehicle 2 meets any of the third-party business participant 10 criteria. For example, if the sensors 4 indicate the user vehicle's fuel level has dropped below a certain percentage, the data center 12 automatically transmits to a user interface 6, 8 via the wireless network 14 a list of suggested service stations that are third-party business participants 10 of the system.

It is also understood that any number of sensors 4 may record user vehicle characteristics simultaneously, and the records may correspond to any number of services offered by third-party participants 10. For example, records by a temperature sensor 4 and a time sensor 4 may indicate that a user vehicle 2 is being operated during the winter at an early hour in the morning. The system database 12 may interpret these records to generate a list of third-party participants 10 that offer goods or services that may be relevant to early morning hours or cold temperatures. For example, the system database 12 may generate a list of third-party participants 10 that are coffee shops or donut shops or to any other number of businesses that would provide relevant services.

At the moment a sensor 4 records and transmits that information to the system database 12, the system database 12 will provide in real time a list of suggested third-party participants 10 based on the vehicle characteristic recorded. For example, in the situation where the sensor 4 records that a vehicle's 2 oil pressure is low, the record will be transmitted to the system database 12 and a list of suggested service stations will be generated and displayed on a user display device 6, 8. In one embodiment the user display device may be a mobile phone 8 or any other device that is capable of relaying information to the user, such as the LED screens 6 that are commonly found on vehicles today to provide navigation, back-up camera display, radio operation, and like functions.

In certain embodiments, the user device 6, 8 is equipped with a mobile application that allows the user to access the list of suggested third-party participants 10 generated by the database 12. The mobile application may be designed such that the user can access a list of nearby third-party participants 10 manually or such that the list of third-party participants 10 will be automatically displayed when the sensor 4 records a pertinent characteristic, or a combination thereof. The system database 12 may also generate certain ROP rewards or reimbursements that do not require the user to interact with any third-party participants 10. For example, in some embodiments the user may be awarded a return on the insurance premium based on the user's safe driving habits and driving record or the user may be awarded a return on premium as a friendly discount from the insurance provider. The system database 12 may, for example, generate the following codes to record that the user has earned a "safe driver" or "friendly discount" return on the insurance premium:

```
{
    "ACCT": "123-45-6789",
    "VIN": "1FT1X6S6H41307570 ",
    "TIME": "2016-06-29:03:30:13 UTC",
    "NAME": "Safe Driver",
    "AMOUNT": 10.00
}
{
    "ACCT": "123-45-6789", "VIN": "1FT1X6S6H41307570", "TIME": "2016-03-12:22:15:27 UTC", "NAME": "Friendly Discount", "AMOUNT": 5.00
}
```

In some embodiments, the mobile application not only allows the user to access a list of participating third-party businesses 10, but also allows the user to access a map showing the user vehicle's location and account and settings pages that allow the user to review ROP information for the user vehicle 2 or the associated owner/driver. In some embodiments, the mobile application also allows the user to review all of the return of premium records that have been recorded on the user's behalf during the current premium cycle. The mobile application may display on the user device 6, 8 the total of all ROP records along with a progress bar that illustrates the percentage of the user's premium which will be returned through the program. In some embodiments, the return of the user's premium may be conditioned on the absence of insurance claim filings. The mobile application may also display a list of all return of premium records that have been satisfied by the user. The following is an example of coding that would generate a display of the return of premium list:

```
{
    "ACCT": "123-45-6789",
    "VIN": "1FT1X6S6H41307570",
    "TotalROP": 319.50,
    "ROPRecords":
    [
        <complete list of all ROP records for given account number & VIN for given term, descending order by date:>
        {
            "TIME": "2016-07-29:02:38:03 UTC",
```

```
      "NAME": "Exxon",
      "AMOUNT": 1.50
    },
    {
      "TIME": "2016-06-29:03:30:13 UTC",
      "NAME": "Safe Driver",
      "AMOUNT": 10.00
    },
    {
      "TIME": "2016-03-12:22:15:27 UTC",
      "NAME": "Friendly Discount",
      "AMOUNT": 5.00
    },
    <etc>
  ]
}
```

In this example, the display message would allow the user to identify the return of premium requirements that have been satisfied. For example, the user could see that requirements for a $1.50 return were satisfied at Exxon. The display message may also provide the user with details regarding other return of premiums, including a safe driver discount and a friendly discount from the insurer. In this example, the display shows the user that the requirements for a $10.00 safe driver return and a $5.00 friendly discount return have been satisfied. The user vehicle sensors 4, mobile application, and database 12 work together to identify, generate, and maintain these and other saving opportunities for insured users based on the physical characteristics associated with the vehicle 2 identified.

Figure 2:
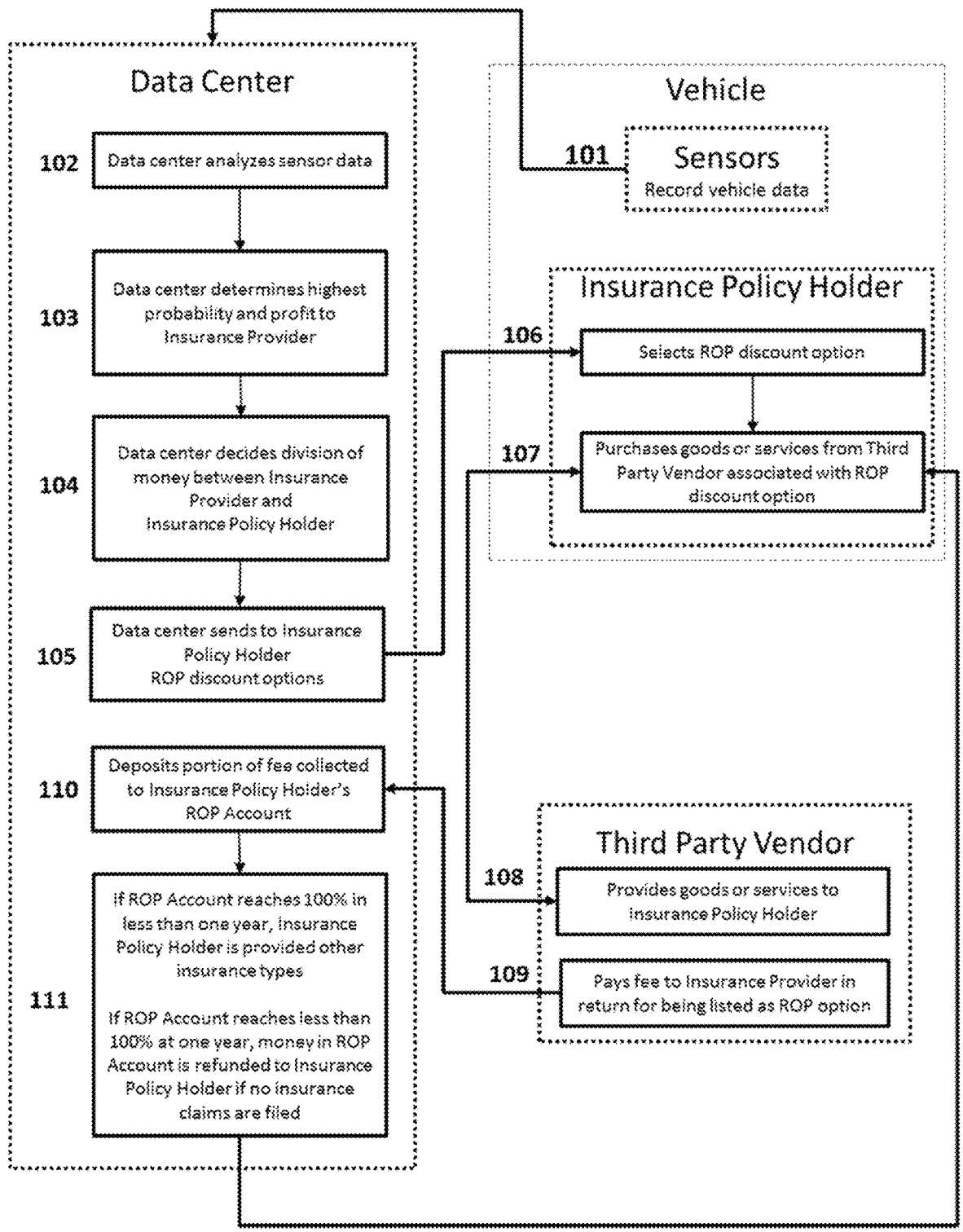
FIG. 2 is a schematic outlining the steps for reimbursing the insurance policy holder the amount of reward opportunities successfully completed.

With regard to FIG. 2, the method for reimbursing an insurance policy holder participating in the ROP reward scheme may be described. It should first be noted that in one embodiment the insurance policy holder must first pay the insurance policy premium to the insurance provider before the reward scheme can be implemented. Once the reward scheme is implemented, FIG. 2 outlines the steps necessary to return all or a portion of the insurance policy payment to the insurance policy holder. As shown in FIG. 2, the sensors first records vehicle data associated with the user vehicle and transmits the data to the database or data center at step 101. At step 102, the data center analyzes the sensor data using a learning algorithm which is used in step 103 to determine the highest probability and profit to the insurance provider. Next, as shown in step 104, the data center decides the portion of the third-party vendor fee (later charged to the third-party vendor in step 109) that will be kept by the insurance provider and the portion that will be returned to the insurance policy holder.

Once the database determines the portion of the user fee that will be returned to the insurance policy holder, the data center sends the insurance policy holder a list of return of premium (ROP) reward options. This is shown in FIG. 2 as step 105. At step 106, the insurance policy holder selects a ROP reward option and at step 107 the insurance policy holder purchases goods or services from the third-party vendor associated with the selected ROP reward option. Once the third-party vendor provides the goods or services to the insurance policy holder at step 108, the third-party vendor is charged a fee by the data center in return for being listed as a vendor in the system, step 109. Once this fee is paid, the data center deposits the portion of the fee that was calculated to be returned to the insurance policy holder in step 104, described above, in an ROP account set up for the insurance policy holder. This is shown as step 110 in FIG. 2. Finally, at step 111 the data center reimburses the insurance policy holder the amount deposited in the ROP account if the insurance policy holder has filed no insurance claims in the insurance period. In one embodiment, the data center determines at step 111 whether the ROP account has reached 100% within the insurance period (in the figure, the example of one year is used as one possible term or insurance period, but the invention is not so limited and any other time period could be used). If the ROP account has reached 100% before the end of the insurance period, the insurance policy holder may be offered additional insurance opportunities or other insurance types or other rewards or incentives.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and subcombinations possible of the group are intended to be individually included. When a range is stated herein, the range is intended to include all subranges and individual points within the range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A computerized system to decrease a payment for a policy holder, comprising:
   a. a vehicle operated by the policy holder;
   b. a plurality of sensors integral to the vehicle that collect data pertinent to vehicle operations, wherein at least one of the plurality of sensors is a GPS receiver and is configured to identify a geographic location of the vehicle;
   c. a transmitter connected to the plurality of sensors;
   d. a data center in communication with the plurality of sensors through the transmitter;
   e. a plurality of third-party business servers each associated with a third-party business and in communication with the data center, wherein the data center stores business information corresponding to each of the plurality of third-party businesses, wherein the business information comprises location data for each of the plurality of third-party businesses; and
   f. a user electronic communication device comprising either a mobile telephone or a display monitor integral to the vehicle, wherein the user electronic communication device comprises a display screen and a processor coupled to a memory programmed with executable instructions, the executable instructions comprising a routine to receive a plurality of discount or reward opportunity data sets from the data center and a routine to create an opportunity graphical user interface visible on the display screen, wherein the opportunity graphical user interface comprises a graphical representation corresponding to at least one discount or reward opportunity from the plurality of discount or reward opportunity data sets,
wherein the data center comprises a routine to receive the data collected from the plurality of sensors and identify in real time a corresponding third-party business from the business information for the plurality of third-party businesses based at least partially on the location data for such one of the plurality of third-party businesses and transmit in real time a message to the user electronic communication device via the data center to provide such business information to the policy holder, and wherein the data center comprises a routine to receive an indicator if a third-party business associated with the business information sent to the policy holder is patronized by the policy holder in response to receiving the business information.

2. The system of claim 1, further wherein each of the plurality of discount or reward opportunities comprises a list of satisfaction requirements corresponding to a discount or reward amount.

3. The system of claim 2, further wherein the executable instructions further comprise a routine to allow the insurance policy holder to select at least one of the plurality of discount or reward opportunities and to display on the display screen an opportunity graphical user interface comprising a plurality of opportunity representations each corresponding to one of the plurality of discount or reward opportunities.

4. The system of claim 3, further wherein the executable instructions further comprise a routine to decrease the insurance policy payment of the policy holder by a discount amount corresponding to the selected discount or reward opportunity when the policy holder satisfies the entirety of the list of satisfaction requirements corresponding to the discount amount.

5. The system of claim 4, further wherein the list of satisfaction requirements comprises a requirement that the policy holder purchase a service from the third-party business corresponding to the selected discount or reward opportunity.

6. The system of claim 5, wherein the data center further comprises a deposit account corresponding to the policy holder.

7. The system of claim 6, wherein the data center comprises a routine to receive the reward amount from the third-party business corresponding to the selected discount or reward opportunity, further wherein the discount or reward amount is deposited into the deposit account corresponding to the policy holder.

8. The system of claim 1, wherein the information about each of the plurality of third-party businesses comprises an identity of the third-party business and a list of services offered by the third-party business.

9. The system of claim 1, wherein the sensor data comprises a plurality of information corresponding to the physical characteristics of the policy holder.

10. The system of claim 1, wherein the sensor data comprises a plurality of information corresponding to the physical characteristics of at least one passenger in the vehicle.

11. The system of claim 1, wherein the user electronic communications device is a mobile telephone.

12. The system of claim 1, wherein the user electronic communications device comprises a display monitor integral to the vehicle.

13. The system of claim 1, wherein the plurality of third-party businesses comprises at least one fueling station.

14. The system of claim 1, wherein the insurance policy payment comprises an insurance premium.

15. The system of claim 1, wherein the insurance policy payment comprises an insurance deductible.

16. A method for reducing a policy payment for a policy holder, wherein said policy holder is operating a vehicle, said method comprising the steps of:
a. recording at the vehicle a set of sensor data via a plurality of sensors located at the vehicle, wherein the plurality of sensors are integral to the vehicle and at least one of the sensors is configured to determine a location of the vehicle;
b. transmitting the sensor data in real time from the vehicle to a data center via a transmitting network;
c. translating at the data center the sensor data into a plurality of reward opportunities, wherein each of the plurality of reward opportunities comprises information corresponding to one of a plurality of third-party businesses in geographic proximity to the vehicle, further wherein each of the plurality of reward opportunities comprises a list of satisfaction requirements;
d. transmitting in real time the plurality of reward opportunities from the data center to a mobile application integrated into a user interface, wherein the user interface comprises either a mobile telephone or a display monitor integral to the vehicle and wherein the user interface comprises a display screen;
e. displaying via the mobile application at the user interface on the display screen of the user interface in real time an opportunity graphical user interface that comprises a graphical representation corresponding to each of the reward opportunities, thereby allowing the insurance policy holder to select at least one of the plurality of reward opportunities by selecting such one of the plurality of reward opportunities on the opportunity graphical user interface at the display screen;
f. receiving from the third-party business corresponding to the selected reward opportunity via the transmitting network a completion confirmation that the insurance policy holder has satisfied the list of satisfaction requirements associated with the selected reward opportunity;
g. receiving a fee from the third-party business corresponding to the selected reward opportunity upon the satisfaction by the policy holder of the satisfaction requirements associated with the selected reward opportunity;
h. crediting at least a portion of the fee received from the third-party business corresponding to the selected reward opportunity to a deposit account maintained at the data center on behalf of the insurance policy holder, thereby reducing the insurance policy payment of the insurance policy holder.

17. The method of claim 16, wherein the list of satisfaction requirements associated with the selected reward opportunity requires the insurance policy holder to purchase a service from the third-party business corresponding to the selected reward opportunity.

18. The method of claim 16, wherein the insurance policy payment comprises an insurance deductible.

19. The method of claim 16, wherein the sensor data comprises a plurality of information corresponding to the physical characteristics of the insurance policy holder.

20. The method of claim 16, wherein the sensor data comprises a plurality of information corresponding to the physical characteristics of at least one passenger in the vehicle.

21. The method of claim 16, wherein the mobile application displays the plurality of reward opportunities as a list.

22. The method of claim 16, wherein the mobile application displays the plurality of reward opportunities as a map.

23. The method of claim 16, wherein the information corresponding to one of the plurality of third-party businesses comprises an identity of the third-party business, a location of the third-party business, and a list of services offered by the third-party business.

24. A system for real-time communications with a moving vehicle, comprising:
   a. a vehicle comprising a display and a sensor configured to sense a real-time geographical location of the vehicle while the vehicle is moving;
   b. a data center in wireless communication with the vehicle;
   c. a processor coupled to the display of the vehicle and comprising a memory programmed with executable instructions, the executable instructions configured to:
      i. transmit the real-time geographical location of the vehicle in real time to the data center;
      ii. receive a real-time response comprising one or more data sets associated with a third-party in geographic proximity to the vehicle, the data sets being received while the moving vehicle is still in geographic proximity to the associated third-party; and
      iii. display in real time on the display of the moving vehicle a graphical user interface, wherein the graphical user interface comprises a graphical representation corresponding to a communication from the associated third-party.

25. The system of claim 24, wherein the vehicle further comprises an input mechanism to receive an acceptance of the displayed opportunity.

26. The system of claim 25, wherein the discount or reward opportunity data sets further comprise an identity of a proximate third-party and a location of such third-party, and wherein the opportunity graphical user interface further comprises a business graphical representation corresponding to the identity of the proximate third-party and the location of such third-party.

* * * * *